April 22, 1969      L. SAVER      3,439,779

VEHICLE BRAKE

Filed July 12, 1967

INVENTOR.
LOUIS SAVER
BY Sherwin H. Barber
his Attorney

United States Patent Office 3,439,779
Patented Apr. 22, 1969

3,439,779
VEHICLE BRAKE
Louis Saver, R.D. 1, Brookville, Pa. 15825
Filed July 12, 1967, Ser. No. 652,769
Int. Cl. F16d 51/00
U.S. Cl. 188—78      3 Claims

ABSTRACT OF THE DISCLOSURE

Brake shoes that are freely movable relative to a rotatable brake drum are adjustably connected together at the bottom and are pivotally movable into frictional engagement with the rotating brake drum by a pair of cams rotated by a fluid actuated cylinder. Return springs connected to the brake shoes restore the brake shoes to a non-operative position when fluid pressure on the cylinder is reduced.

BACKGROUND OF THE INVENTION

This invention relates to brakes and, more particularly, to vehicle brakes of the type used on automobiles, trucks, and other wheeled vehicles.

In conventional wheel brake arrangements, each one of a pair of brake shoes is pivoted to an anchor pin fixed to a backing plate, usually located adjacent the lower end of each brake shoe, and the upper ends of the brake shoes connect to piston rods projecting from a single wheel brake fluid actuated cylinder disposed between and connected to the upper ends of the brake shoes. Such a brake arrangement wears rapidly and there is no means for moving either the anchor pins or the shoes relative to each other to compensate for wear of the brake lining.

The present invention, however, comprises a vehicle brake arrangement that overcomes the difficulties of the presently available brakes and affords greater braking power because of greater frictional surface in contact with the brake drum.

SUMMARY OF THE INVENTION

According to the invention, freely movable brake shoes are adjustably connected together at their bottom ends and are urged outwardly at the top end into frictional engagement with a rotating brake drum by cams that rotate in response to fluid under pressure in a brake cylinder having pistons that coact with arms mounted on shafts supporting the cams; the cams pivot the brake shoes about the adjustable connection at the bottom of the shoes.

For a further understanding of the invention and for features and advantages thereof, reference may be made to the following detailed description in conjunction with the drawing which shows, for the purpose of exemplification, a preferred embodiment of the invention.

DETAILED DESCRIPTION

Figure 1:
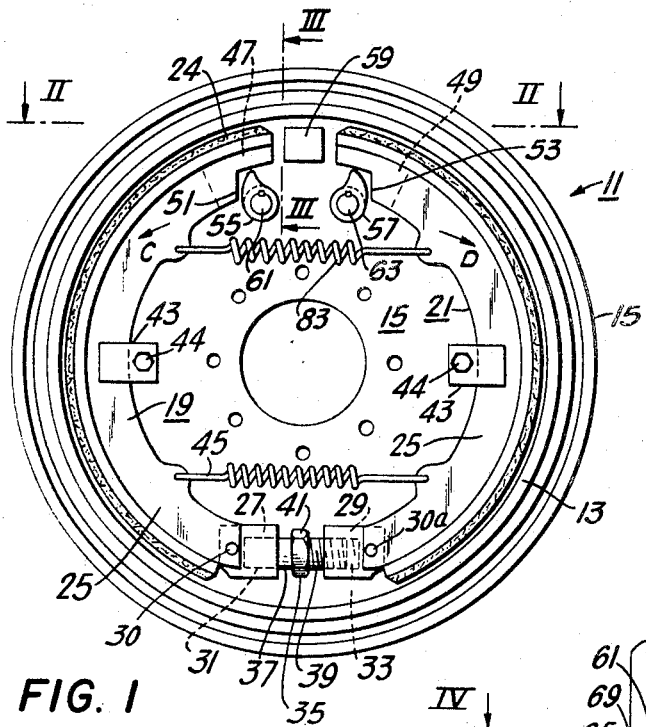
FIG. 1 is a schematic elevational view, partly in section, of a wheel brake assembly incorporating the invention.
Figure 2:
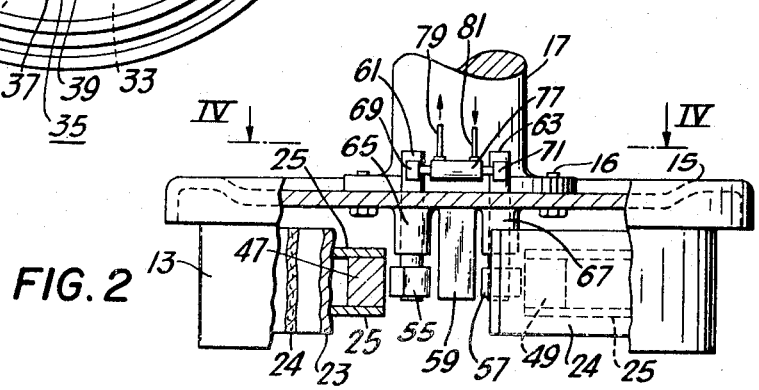
FIG. 2 is a view along line II—II of FIG. 1.

The brake assembly illustrated in FIGS. 1, 2 includes a rotatable brake drum 13 that is mounted in the usual manner to a wheel (not shown), and at the open side of the brake drum there is a support or backing plate 15 that is bolted as at 16 to the end of an axle housing 17. The frictional means of the brake assembly 11 includes a pair of left 19 and right 21 arcuate brake shoes, as viewed in FIG. 1. Each brake shoe 19, 21 is comprised of an arcuate band or table 23 to which is mounted frictional brake lining 24 in the usual manner, and a pair of spaced apart parallel arcuate webs 25 that are integrally formed with the band or table 23. In some applications, depending upon the service use and the braking area required, it may be desirable to construct the band or table 23 with only a single web. Abutments 27, 29 are pivotally mounted between the ribs 25 at the bottom of each brake shoe 19, 21 by pins 30, 30a that may be a bolt and nut type of fastener, or a rivet type of fastener. The abutment 27 has a smooth walled bore 31 in one surface that faces the abutment 29 and this abutment has a threaded bore 33 in a surface facing abutment 27. A brake shoe adjusting strut 35, comprised of a cylindrical first element 37, an externally threaded cylindrical second element 39, and a nut 41 disposed between the first and second elements, connects the abutments 27, 29. The first and second elements 37, 39 are coaxial and they reside respectively in the smooth bore 31 and the threaded bore 33, with the nut 41 positioned between the abutments. The nut 41 is positioned close to an aperture (not shown) in the backing plate through which a tool may be inserted to engage the nut and rotate it. In this way, the lower ends of the brake shoes 19, 21 move further apart or move together, thereby providing for adjustment of the amount of brake shoe frictional area in contact with the rotating wheel drum. In some applications, the outer surface of the nut 41 may have serrations thereon to more readily cooperate wi h the tool. Any suitable means known in the art may be used to hold and maintain the nut 41 and strut 35 in a selected position between selected adjusted positions of the brake shoes 19, 21.

Each brake shoe 19, 21 is loosely supported in a guide 43 that is bolted, as at 44, to the backing plate 15. The brake shoes 19, 21, are then simply supported and they are free to move radially into frictional engagement with the drum 13, and are free to return to an initial position of non-frictional engagement. A spring 45 connects the lower ends of the brake shoes 19, 21 and maintains the first element 37 in the smooth walled bore 31, when the braking force is released; the threaded element 39 will, of course, remain in position in the threaded bore 33.

The upper end of the brake shoes 19, 21 are also provided with abutments 47, 49 respectively, that are fitted between and fixed to the ribs 25 of each brake shoe 19, 21. The abutments 47, 49, however, are cut away in the lower portion, as indicated in FIG. 1, to provide substantially vertical surfaces or lands 51, 53 against which cams 55, 57 coact.

An anchor pin or stop bar 59, which may have a square, or round, or any other suitable cross sectional shape, is integrally formed with or securely fixed to the backing plate 15. The stop bar 59 is located between the opposed upper ends of the brake shoes 19, 21 and opposite the abutments 47, 49. The abutments 47, 49 engage the stop bar 59 whenever the brake shoes 19, 21 are urged into frictional engagement with the rotating brake drum 13. If it is assumed that the brake drum 13 rotates in a clockwire direction (FIG. 1) then when brake shoe 19 engages the brake drum, the brake shoe tends to rotate clockwise also. But, the abutment 47 engages the stop bar 59 and prevents further rotation of the brake shoe assembly. Likewise, if the brake drum 13 is rotating in a counterclockwise direction, then brake shoe 21 tends to rotate counterclockwise when it is brought into frictional engagement with the brake drum, and abutment 49 engages the stop bar 59, thereby preventing further rotation of the brake shoe assembly.

Figure 3:
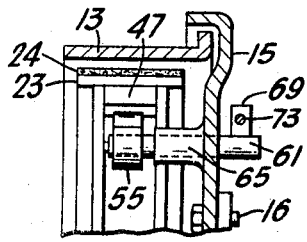
FIG. 3 is a view along line III—III of FIG. 1.
Figure 4:
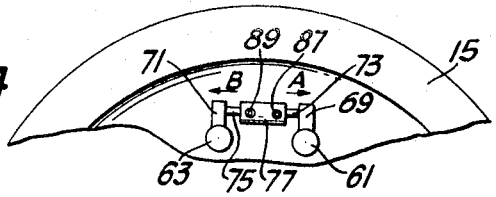
FIG. 4 is a view along line IV—IV of FIG. 2.
Figure 5:
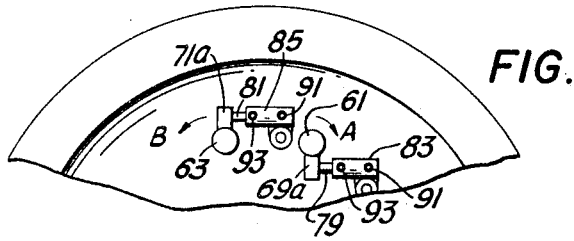
FIG. 5 is a modification of the showing in FIG. 4.

The cams 55, 57 are keyed to shafts 61, 63 that are supported in housings or sleeves 65, 67 integrally formed with, or suitably fixed to, the backing plate 15. The shafts 61, 63 project through the backing plate 15, and each shaft 61, 63 is provided with an arm 69, 71 extending perpendicularly to the axis of the shaft to which it is attached (FIGS. 3, 4). In FIG. 4, the arms 69, 71 are connected to piston rods 73, 75 extending out of a single fluid cylinder piston arrangement 77. In the modification of the invention shown in FIG. 5, the arms 69a, 71a, however, are connected to a respective piston rod 79, 81 of the individual cylinder-pistons 83, 85. Fluid inlet 87 and fluid outlet 89 conduits communicate with the cylinder 77, and fluid inlet 91 and fluid outlet 89 communicate with each respective piston cylinder 83, 85.

Thus, when fluid under pressure flows into cylinder 77 the piston rods 73, 75 move outwardly and the levers 69, 71 pivot simultaneously in the direction of the arrows A and B respectively. Likewise, when fluid flows into the cylinder piston-arrangements 83, 85, the piston rods 79, 81 move outwardly, and the arms 69a, 71a also pivot in the direction of the arrows A and B; that is, in the same directions as the arms 69, 71. The cylinder 77 is freely supported between the arms 69, 71 and is not mounted to the backing plate 15. Thus, the lower ends of the brake shoes move freely when braking occurs, and the brake shoes tend to rotate along with the brake drum, as mentioned previously. The cylinder-piston arrangements 83, 85 are mounted in a swivelled manner, however, to the backing plate 15 or they may be suitably mounted in any other preferred manner to the backing plate.

It is a feature of the present invention that the brake shoes are free floating and are self-energizing; that is, the brake mechanism of the invention has full effectiveness in both forward and reverse braking.

It is a feature of the present invention that the cams move the brake shoes into engagement with the brake drum, and the cams slidably act on the vertical surfaces of lands thereby reducing frictional wear and the force that must be exerted to move the brake shoes outwardly.

It is a feature of the invention that the braking cylinder is smaller than that required in presently available structures and less braking force is required to move the brake shoes outwardly because of the leverage action developed by the cams.

What is claimed is:
1. A vehicle wheel brake assembly comprising:
(a) a brake drum mounted to a rotatable wheel;
(b) a stationary backing plate mounted adjacent said brake drum;
(c) a plurality of spaced apart arcuate brake shoes positioned on said backing plate and adapted for frictional engagement with and movement away from said brake drum;
(d) means rigidly secured to said backing plate between opposed adjacent first ends of said brake shoes for limiting the rotation thereof during braking engagement with said brake drum;
(e) an adjusting element positioned between opposed adjacent second ends of said brake shoes;
(f) means for moving said adjusting element whereby the second ends of said brake shoes are relatively movable either apart or towards each other;
(g) abutments secured to the first ends of said brake shoes;
(h) cams mounted on spaced apart shafts supported by said backing plate and positioned adjacent said abutments, said cams being rotatable in a plane that is parallel to the plane of said brake shoes;
(i) a fluid cylinder-piston arrangement connected to said shafts and operable to rotate said shafts and said cams and to urge said brake shoes into frictional engagement with said brake drum; and
(j) means to remove said brake shoes from frictional engagement with said brake drum when said fluid cylinder-piston arrangement is inoperative.

2. The invention of claim 1 wherein:
(a) said cylinder-piston arrangement includes a plurality of cylinder-piston arrangements with a single cylinder-piston connected to each shaft for rotating said shaft and the cam mounted thereon; and
(b) means mounting each said cylinder-piston arrangement to said backing plate.

3. The invention of claim 1 wherein:
(a) said cylinder-piston arrangement includes a cylinder mounted to said plate and having therein pistons with shafts extending from opposite ends of said cylinder that engage said shafts; and
(b) means to move said pistons whereby said cams rotate and engage said abutments and urge both of said brake shoes into frictional engagement with said brake drum.

References Cited

UNITED STATES PATENTS

| | | |
|---|---|---|
| 1,956,979 | 5/1934 | Carlson. |
| 2,154,836 | 4/1939 | Fike. |
| 2,335,839 | 11/1943 | Darling _____ 188—78 X |
| 2,633,939 | 4/1953 | Dodge. |

FOREIGN PATENTS

| | | |
|---|---|---|
| 34,335 | 12/1928 | France. |
| 35,976 | 12/1929 | France. |

MILTON BUCHLER, *Primary Examiner.*

THOMAS W. BUCKMAN, *Assistant Examiner.*